J. McCLELLAN.
VINE CUTTER.
APPLICATION FILED MAY 24, 1912.
1,060,108.
Patented Apr. 29, 1913.
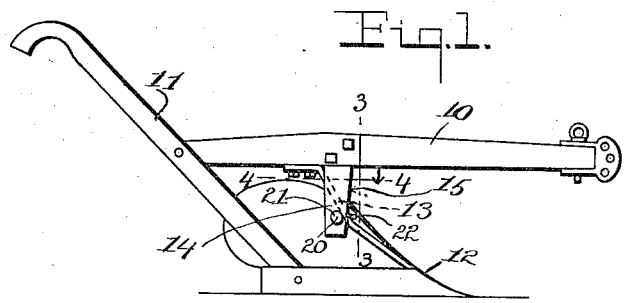
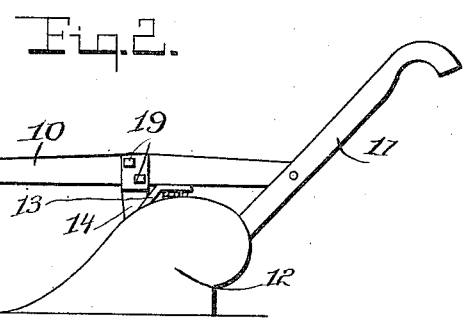
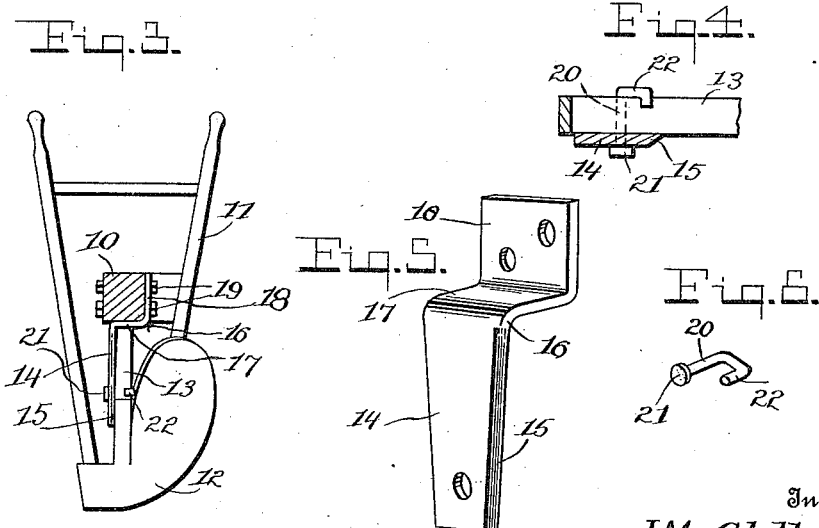
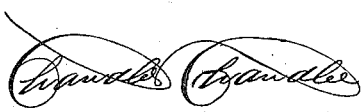
Witnesses
R. N. Jones,
Francis Boyle
Inventor
J. McClellan.
By Chandler & Chandler
Attorneys

UNITED STATES PATENT OFFICE.

JOHN McCLELLAN, OF CASANOVA, VIRGINIA.

VINE-CUTTER.

1,060,108.  Specification of Letters Patent.  Patented Apr. 29, 1913.

Application filed May 24, 1912. Serial No. 699,507.

*To all whom it may concern:*

Be it known that I, JOHN McCLELLAN, a citizen of the United States, residing at Casanova, in the county of Fauquier, State of Virginia, have invented certain new and useful Improvements in Vine-Cutters; and I do hereby declare the following to be a full, clear, and exact description of the invention, such as will enable others skilled in the art to which it appertains to make and use the same.

This invention relates to vine cutting attachments for plows and has for an object to provide a novel vine cutter which is adapted to be secured to the plow beam and is further equipped with a novel means for anchoring the vine cutter to the plow standard.

With the above object in view the invention consists of certain novel details of construction and combination of parts hereinafter fully described and claimed, it being understood that various modifications may be made in the minor details of construction within the scope of the appended claims.

In the accompanying drawing forming part of this specification:—Figure 1 is a side elevation of a plow equipped with my improved vine cutter. Fig. 2 is a view in elevation showing the reverse side of the parts shown in Fig. 1. Fig. 3 is a vertical sectional view taken on the line 3—3 Fig. 1 with the plow share shown in elevation. Fig. 4 is a horizontal sectional view taken on the line 4—4 Fig. 1. Fig. 5 is a detail perspective view of the vine cutter. Fig. 6 is a detail perspective view of the vine cutter J-bolt.

Referring now to the drawing in which like characters of reference designate similar parts, an ordinary plow is shown comprising a beam 10, handles 11 and share 12, the share being equipped with the usual standard 13 secured at the upper end to the plow beam.

The vine cutter comprising the subject-matter of this invention consists of a blade 14 having the front edge sharpened to provide a clean cutting edge 15. The blade is provided at the upper end with an integral attaching bracket 16 formed preferably by bending the blade outwardly as shown at 17 and thence upwardly as shown at 18 to conform to the bottom edge and side of the plow beam. Bolts 19 are passed through the bracket and plow beam to rigidly secure the blade in position. The blade extends vertically downward from the beam between the mold board and land side of the plow and terminates above the land side. Trailing vines carried by the earth turned over by the mold board and extending across the land side will be severed as the plow advances, by the leading cutting edge of the blade.

For securing the blade against vibrating movement laterally, a substantially J-shaped bolt 20 is passed through the blade and then headed as shown at 21, the bight 22 of the bolt being hooked over the standard 13. This bolt provides a rigid connection between the blade and the standard and positively prevents any vibratory movement of the blade.

What is claimed, is:—

1. The combination with the beam and standard of a plow, of a vine cutting blade depending from said beam, and a J-bolt having the shank fixed to the lower end of said blade and having the bight hooked over said standard.

2. The combination with the beam and standard of a plow, of a vine cutting blade depending from the beam and having the upper end bent outwardly and thence upwardly and conforming to the bottom and side faces of said beam, bolts passed through said beam and said bent portion, and a J-bolt having a head fixed to said blade near the lower end thereof and having the bight hooked over said standard.

In testimony whereof, I affix my signature, in presence of two witnesses.

JOHN McCLELLAN.

Witnesses:
R. O. ST. CLAIR,
R. A. McINTYRE.

Copies of this patent may be obtained for five cents each, by addressing the "Commissioner of Patents, Washington, D. C."